(12) United States Patent
Xiao et al.

(10) Patent No.: US 9,481,286 B1
(45) Date of Patent: Nov. 1, 2016

(54) CARGO SUPPORT DEVICE (71) Applicants: Zhaoyin Xiao, Taizhou (CN); Zhengzhong Zhu, Taizhou (CN)

(72) Inventors: Zhaoyin Xiao, Taizhou (CN); Zhengzhong Zhu, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 0 days.

(21) Appl. No.: 14/944,242

(22) Filed: Nov. 18, 2015

(30) Foreign Application Priority Data

May 20, 2015 (CN) .......................... 2015 1 0262182

(51) Int. Cl.
*B60P 7/08* (2006.01)
*B60P 7/15* (2006.01)

(52) U.S. Cl.
CPC ....................................... *B60P 7/15* (2013.01)

(58) Field of Classification Search
CPC ....................................................... B60P 7/15
USPC ...................... 410/143, 145, 151; 211/105.3; 248/354.6, 354.7; 254/12, 95, 108, 254/112; 74/141.5, 167, 169
See application file for complete search history.

(56) References Cited

U.S. PATENT DOCUMENTS

| | | | |
|---|---|---|---|
| 2,974,931 A * | 3/1961 | Reel .......................... | B60P 7/15 410/151 |
| 2006/0051179 A1* | 3/2006 | Scott ......................... | B60P 7/15 410/151 |

FOREIGN PATENT DOCUMENTS

| | | |
|---|---|---|
| CN | 200910097476.0 | 9/2009 |
| CN | 201420499908.7 | 12/2014 |

* cited by examiner

*Primary Examiner* — Stephen Gordon
(74) *Attorney, Agent, or Firm* — Minder Law Group; Willy H. Wong (57) ABSTRACT

A cargo support device comprises an inner tube and an outer tube enclosing the inner tube. The inner tube can partially stretch out from the outer tube. A handle is hinged on the outer tube. There is a strip-shaped groove designed on the inner tube in the axial direction. A long toothed rack is embedded into the groove. There is a ratchet at the end of the handle, which meshes with the teeth on long toothed rack. The cargo support device can also comprise a locator which can lock the handle when the ratchet meshes with the teeth. The teeth on the cargo support device are not directly punched on the inner tube, but set on a separate long toothed rack embedded in the groove of the inner groove. This will properly increase the depth of the teeth.

20 Claims, 7 Drawing Sheets

CARGO SUPPORT DEVICE

RELATED APPLICATIONS

This application claims benefit of Chinese Patent Application No. CN201510262182.4, filed May 20, 2015. The above application is incorporated by reference herein.

BACKGROUND OF THE INVENTION

1. Field of Invention

The present invention relates to the field of mechanical devices, and particularly to an apparatus to secure cargo or a type of cargo support device.

2. Related Art

At present, for goods in containers or vans, it is difficult to secure certain goods with ordinary ropes. In order to resolve such an issue, various different tools are designed, and the cargo support device is one of them. The existing cargo support device basically comprises an outer tube and an inner tube which is installed in the outer tube and stretches out. There is a row of teeth designed in the inner tube. A handle is connected to the out tube, and there is a ratchet at the end of the handle, which meshes with the teeth. With the mesh movement, the stretch and the retraction of the inner tube are controlled. Typically, there is a stopper designed to secure and lock.

One prior art cargo support device comprises an inner tube and an out tube partially overlapping the inner tube. There are teeth designed at the outer side of the inner tube, in the axial direction. This mechanism also comprises a handle hinged on the outer tube and the inner side of the handle can be embedded in the teeth. There is a locator between the outer tube and the handle. When the inner side of the handle is embedded in the teeth, the locator fixes the handle. In that technical proposal, the teeth are directly punched on the surface of the inner tube. For the purpose of protecting the inner tube, the depth of the teeth is shallow. This causes that the meshing strength between the ratchet at the end of the handle and the teeth is insufficient, and the teeth are easy to be worn during the continuous opening and closing process of the handle.

Another prior art cargo support device comprises an outer tube and an inner tube which is partially inside the outer tube and stretches out from the outer end of the outer tube. A handle is hinged on the outer tube and there is a ratchet on the inner end of the handle. A toothed rack is fastened to the outer end of the inner tube with fasteners. On the rack, there are several teeth in axial direction, which can mesh with the ratchet. There is an extension tube enclosing the outer tube. On the side faces of the extension tube, there are adjustment holes in line with each other, arranged in the axial direction. There is a locating hole on the side faces of the inner end of the outer tube. A locator is configured between the outer tube and the extension tube, which connects or disconnects both tubes when the locating hole is aligned with the adjustment hole. In that technical proposal, although the toothed rack is fastened to the inner tube, instead of being punched on the inner tube, it requires the casting process. The weight increases and more material is used, which increases the production cost of the manufacturer.

SUMMARY OF THE INVENTION

One objective of an embodiment of the invention is to avoid the issues stated above in the prior art, and to provide a cargo support device.

Another objective of an embodiment of the invention is to resolve is how to ensure a stable mesh between the teeth on the inner tube and the ratchet on the handle Another objective of an embodiment of the invention is to reduce the production cost.

The above objectives can be achieved by the following embodiments of the invention:

In one embodiment, a cargo support device comprises an inner tube and an outer tube enclosing the inner tube. The inner tube can partially stretch out from the outer tube. A handle is hinged on the outer tube. The cargo support device is characterized in that:

There is a strip-shaped groove designed on the inner tube in the axial direction. A long toothed rack is embedded into the groove. There is a ratchet on the end of the handle, and the ratchet can mesh with the teeth on the toothed rack. The said cargo support device also comprises a locator which can lock the handle when the ratchet meshes with the teeth.

Below is the principle of the device:

In the initial state, most of the inner tube is inside the outer tube, and thus the overall length of both tubes is short. Supporting plates are configured on both outer ends of the inner and outer tube. When used, the inner tube moves outwards in relation to the outer tube, so the overall length increases and the cargo can be supported by the supporting plates. A long toothed rack is embedded into the groove on the inner tube. The ratchet on the end of the handle meshes with the teeth on the toothed rack by pulling the handle. The ratchet rotates and drives the rack to move, so that the inner tube is driven to keep moving outwards to support the cargo further firm. When the handle is pulled in place, the position can be locked with the locator and the supporting process completes.

In this technical proposal, since the teeth are not machined directly on the inner tube, but separately machined on the rack, the depth of the teeth meshing with the ratchet can be increased properly. Compared with the conventional process of direct punch forming, in this technical proposal, the teeth with proper depth can not only increase the meshing stability with the ratchet of the handle, but also reduce the wear of the teeth during the use. Since it is much easier to set a groove than to set teeth on the inner tube, compared with the conventional process, this cargo support device can reduce the machining difficulty, increase the production efficiency and reduce the production cost. The long toothed rack is embedded in the long groove on the inner tube and it's limited by the side faces of the groove, which ensure the firmness of the connection between the rack and the inner tube.

In one embodiment, there is an opening on the outer tube, and the ratchet on the handle can pass it and meshes with the teeth on the long toothed rack. The handle is set above the outer tube, which makes the structure compact and the operation convenient.

In one embodiment, the opening is through the wall of the said outer tube. The opening can be strip-shaped, or be square.

In one embodiment, a bracket is installed on the outer tube and it comprises a cylinder enclosing the outer tube. A gap is designed on the side wall of the cylinder in the axial direction. Two fixing plates are installed outwards on both sides of the gap on the cylinder, and the handle is hinged on the fixing plates. There is a grip on one end of the handle while the said ratchet is on the other end. The bracket is coupled to the outer tube with the cylinder, so the assembly is easy. Fixing plates are used to hinge the handle, so as to fix the handle to the outer tube. The ratchet on the end of the handle meshes with the teeth on the toothed rack by rotating the hinged handle, so as to drive the inner tube to stretch out to support the cargo firm. In this technical proposal, the bracket is made of iron, so the cost on the material and the process is low.

In one embodiment, there is a bolt on the bracket, passing through the two fixing plates. The handle is hinged on the fixing plates with the bolt. One of the functions of the bolt is to hinge the handle, and another one is to drive the fixing plates to approach each other by screwing the bolt, so as to contract the inner diameter of the cylinder and make it grip the outer tube firmer.

In one embodiment, both of the said opening and the ratchet are inside the bracket. The bracket protects the ratchet and prevents the dust, and can ensure a firm and reliable installation of the ratchet as well.

In one embodiment, a block is fixed to the bracket. The block is between the two fixing plates, located at the hinge point of the handle near the grip. When rotated around the hinge point, the handle will lean against the block. When the handle rotates around the hinge point, the block limits its position, ensure the handle in place after the rotation, and help it get locked.

In one embodiment, the locator is a clip, whose middle part is hinged on the handle. One end of the clip stretches upwards, out of the handle, and the other end has a hook which stretches downwards, out of the handle. In the middle part of the clip, a torsion spring is installed which allows the hook to rotates around the hinge point and lean against the said block. When the ratchet on the handle meshes with the teeth on the long toothed rack and rotate to the designed place, under the torsion force of the torsion spring, the hook on the clip can hook the block and lock the handle. When it's required to loosen the support, an external force is applied to move the clip and overcomes the elastic force of the torsion spring, therefore, the hook of the clip detaches from the block and the inner tube will retract by reverse-rotating the handle. In this technical proposal, both of the outer tube and the clip can be formed by punching process, so the cost is reduced.

In one embodiment, the long toothed rack is embedded into the groove of the inner tube and the clip is installed inside the handle, so the structure of the cargo support device is more compact.

In one embodiment, the handle may be locked and secured with bolts.

In one embodiment, the inner tube stretches out of the outer end of the outer tube, so the inner diameters at the outer end of the outer tube and the opening are less than that at the inner end of the outer tube. The inner wall of the outer tube plays a limited role in limiting the position, prevents the inner tube from swaying, keeps it stable and mitigates the additional wear of the teeth.

In one embodiment, the long toothed rack comprises a long half rack I and half rack II. In general, in cargo support devices, the teeth meshing with the ratchet on the handle have a certain width, and are manufactured in the form of toothed rack separately as a whole. This is difficult to be achieved by punching process. In this technical proposal, two half rack are joined together to form one rack having a big width; namely, the half rack I and half rack II connects to each other side by side, forming a rack with doubled width. This reduces the scrap material, and allows the adoption of the punching process to reduce the manufacturing difficulty and the production cost.

In one embodiment, the teeth of half rack I and half rack II are the same, and both racks are aligned. Both racks are punched parts. The half rack I and half rack II are joined side by side, and the teeth of both racks are aligned, forming a complete long toothed rack. The same application effect is achieved and the cost of punching process is reduced.

In one embodiment, the depth of the teeth on half rack I and half rack II is 5 mm-20 mm. The teeth are fully able to mesh with the ratchet.

In one embodiment, there is a protrusion on one side of the half rack I and there is a recess on the one side of the half rack II fitting the protrusion. The protrusion inserts in the recess. With the fit between the protrusion and the recess, the half rack I and half rack II are connected, and the relative position is limited. This ensures the stability of the long toothed rack formed by the half rack I and half rack II, the machining is simple and the assembly is convenient.

In one embodiment, after the half rack I and half rack II are joined together by inserting the protrusion into the recess, the firmness of the assembly can be enhanced by welding. Holes are punched on the whole long toothed rack for pin fixation.

In one embodiment, the half rack I and half rack II are embedded in the groove on the inner tube, and fixed by pins.

Compared to the prior art, some embodiments of the invention have the following advantages:
1. The teeth are not directly punched on the inner tube, but set on a separate long toothed rack embedded in the groove of the inner groove. This will properly increase the depth of the teeth. Teeth with greater depth can increase the meshing stability with the ratchet of the handle, reduce the wear of the teeth as much as possible during the use, and ensure the firmness of the long toothed rack as well.
2. It is much easier to machine a groove on the inner tube than to machine teeth.

Punching teeth separately can reduce the machining difficulty, increase the production efficiency and reduce the production cost.

DETAILED DESCRIPTION OF THE INVENTION

Embodiments of this invention will be described below and the technical solutions of the invention will be further illustrated in connection with the accompanying figures. However, the present invention shall not be limited to these embodiments.

As shown in FIG. 1 through FIG. 7, an embodiment of the cargo support device comprises an inner tube (1) and an outer tube (2) enclosing the inner tube (1). The inner tube (1) can partially stretch out from the outer tube (2). A handle (3)

is hinged on the outer tube (2). There is a strip-shaped groove (4) designed on the inner tube (1) in the axial direction. A long toothed rack (5) is embedded into the groove (4). There is an opening (6) on the outer tube (2), which is a hole through the wall of the outer tube (2). The ratchet (32) on the handle (3) can pass the opening (6) and meshes with the teeth (53) on the long toothed rack (5). A bracket (10) is installed on the outer tube (2). The handle (3) is hinged on the bracket (10). There is a grip (31) on one end of the handle (3) and ratchet (32) is on the other end.

Figure 2:
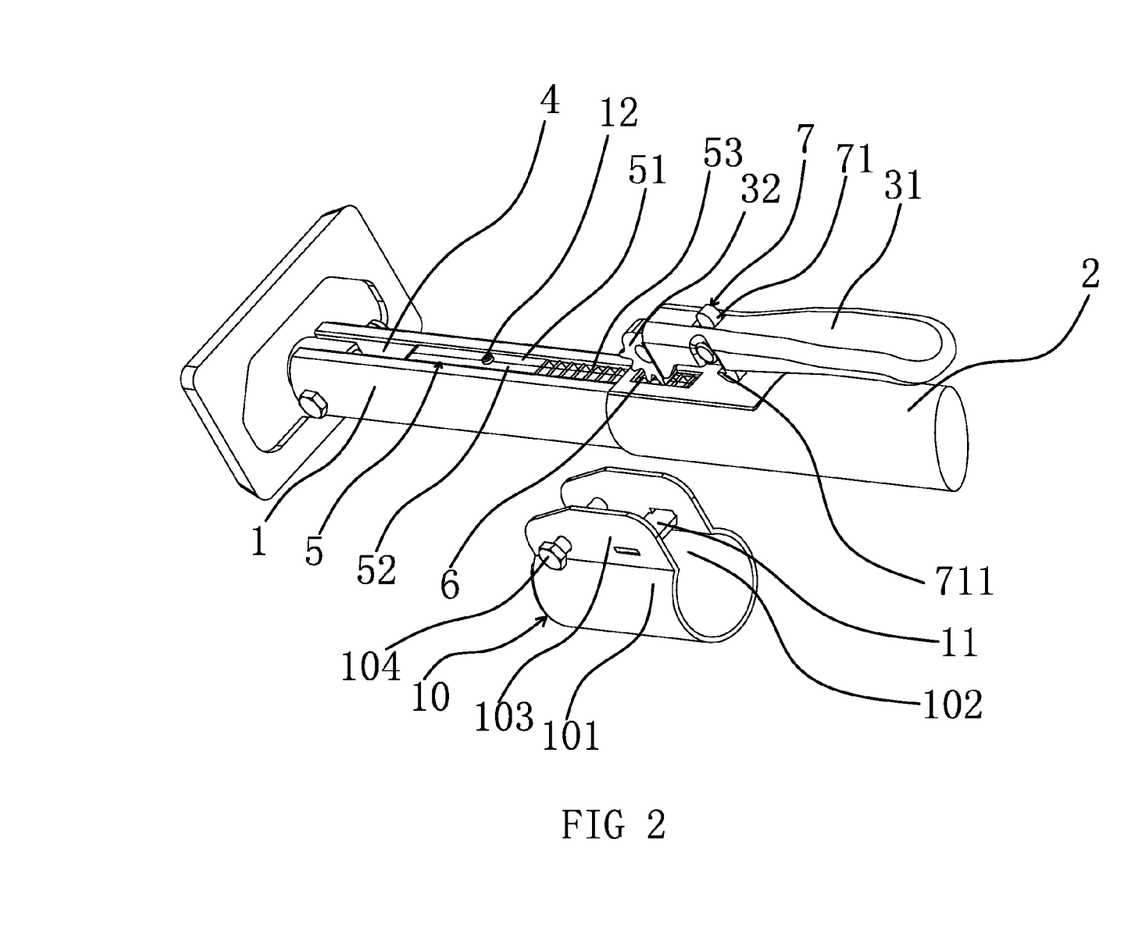
FIG. 2 is the magnified detailed schematic view of an embodiment of the cargo support device.
Figure 3:
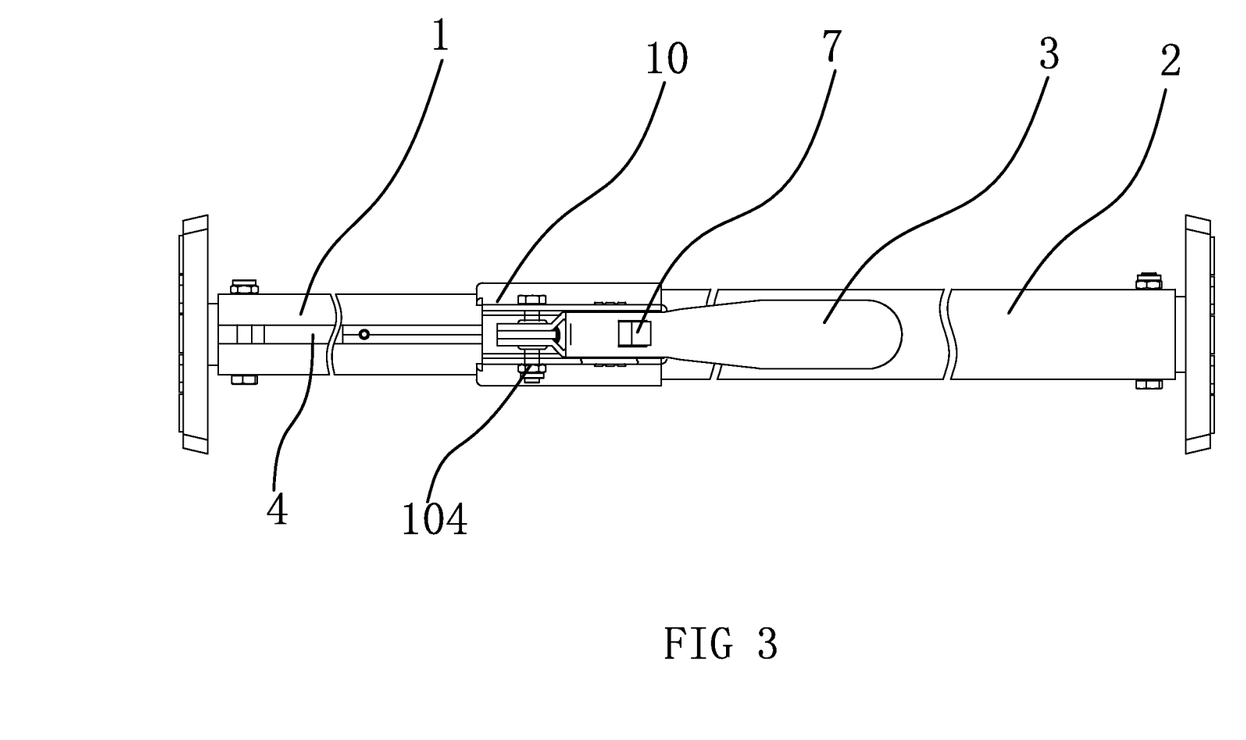
FIG. 3 is the top schematic view of an embodiment of the cargo support device.

As shown in FIG. 2 and FIG. 3, in one embodiment, the bracket (10) comprises a cylinder (101) enclosing the outer tube (2). A gap (102) is designed on the side wall of the cylinder (101) in the axial direction. Two fixing plates (103) are installed outwards on both sides of the gap (102) on the cylinder (101), and the handle (3) is hinged on the fixing plates (103). There is a bolt (104) on the bracket (10), passing through the two fixing plates (103). The handle (3) is hinged on the fixing plates (103) with the bolt (104). Both of the opening (6) and the ratchet (32) are inside the bracket (10). A block (11) is fixed to the bracket (10). The block (11) is between the two fixing plates (103), located at the hinge point of the handle (3) near the grip (31). When rotated around the hinge point, the handle will (3) lean against the block (11). The bolt (104) passes through the two fixing plates (103) to hinge the handle (3), and the distance between the two fixing plates (103) will be changed by adjusting the bolt (104), so as to tighten or loosen the bracket (10) enclosing the outer tube (2). The block (11) is fixed to the fixing plates (102), and indirectly to the outer tube (2). The cargo support device also comprises a locator (7) which can lock the handle (3) when the ratchet (32) meshes with the teeth (53). The locator (7) is a clip (71), whose middle part is hinged on the handle (3). One end of the clip (71) stretches upwards, out of the handle (3), and the other end has a hook (711) which stretches downwards, out of the handle (3). In the middle part of the clip (71), a torsion spring (72) is installed which allows the hook (711) to rotates around the hinge point and lean against the block (11).

The groove (4) on the inner tube (1) is square, and its shape matches the bottom of the long toothed rack (5). The bottom of the long toothed rack (5) is fixed on the bottom of the groove (4).

In the initial state of the use, most of the inner tube (1) is inside the outer tube (2), and thus the overall length of both tubes is short. When used, the inner tube (1) moves outwards in relation to the outer tube (2), so the overall length of the inner tube (1) and the outer tube (2) increases and the cargo can be supported. The ratchet (32) on the end of the handle (3) meshes with the teeth (53) on the long toothed rack (5) by pulling the handle (3). The ratchet (32) rotates and drives the rack (5) to move, so that the inner tube (1) is driven to keep moving outwards to support the cargo further firm. When the handle (3) rotates to the designed place, under the torsion force of the torsion spring (72), the hook (711) on the clip (71) can hook the block (11), locks the handle (3) and the cargo supporting process completes. When it's required to loosen the support, an external force is applied to move the clip (71) and overcomes the elastic force of the torsion spring (72), therefore, the hook (711) of the clip (71) detaches from the block (11) and the inner tube (3) will retract by reverse rotating the handle (3).

In one embodiment, both of the outer tube and the clip are formed by punching process, to reduce the cost.

Figure 1:
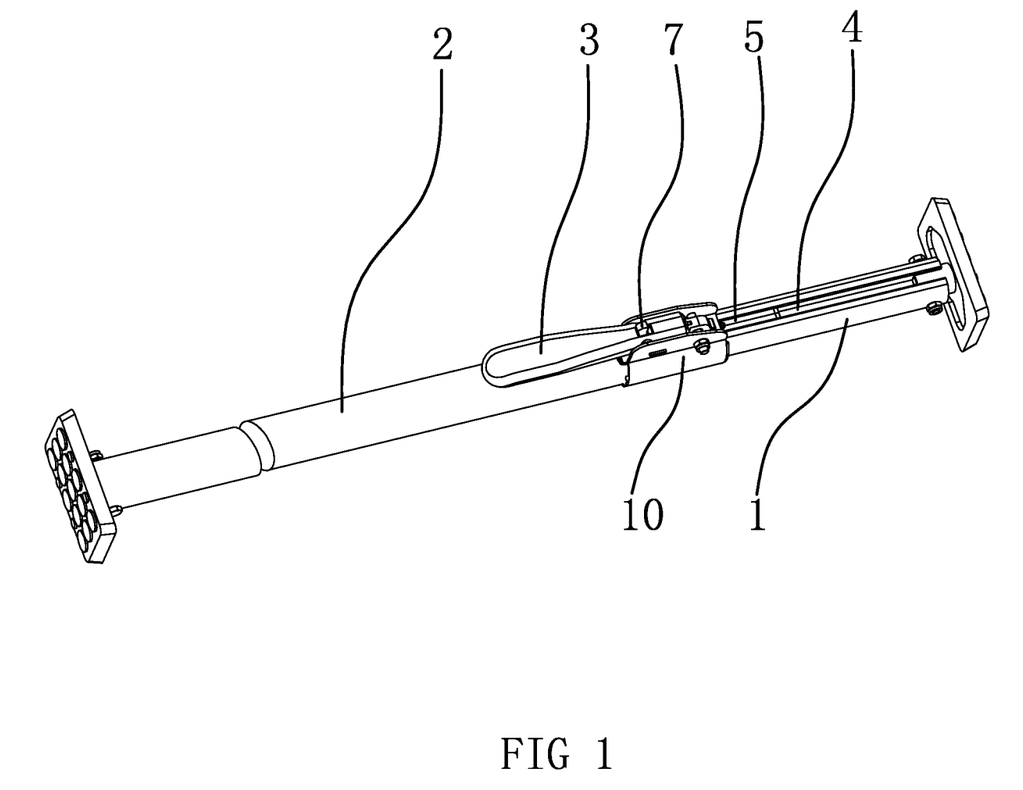
FIG. 1 is the perspective schematic view of an embodiment of the cargo support device.
Figure 4:
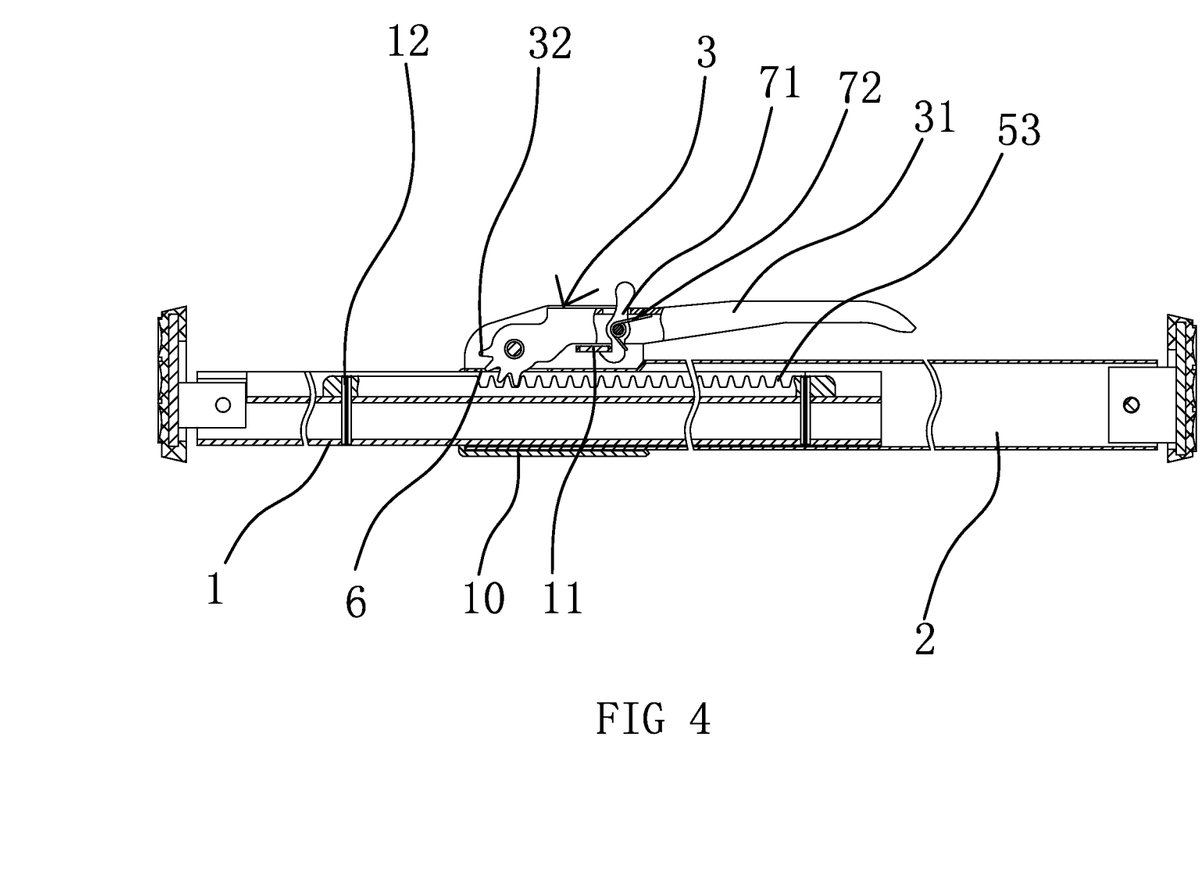
FIG. 4 is the detailed cutaway schematic view of an embodiment of the cargo support device.
Figure 5:
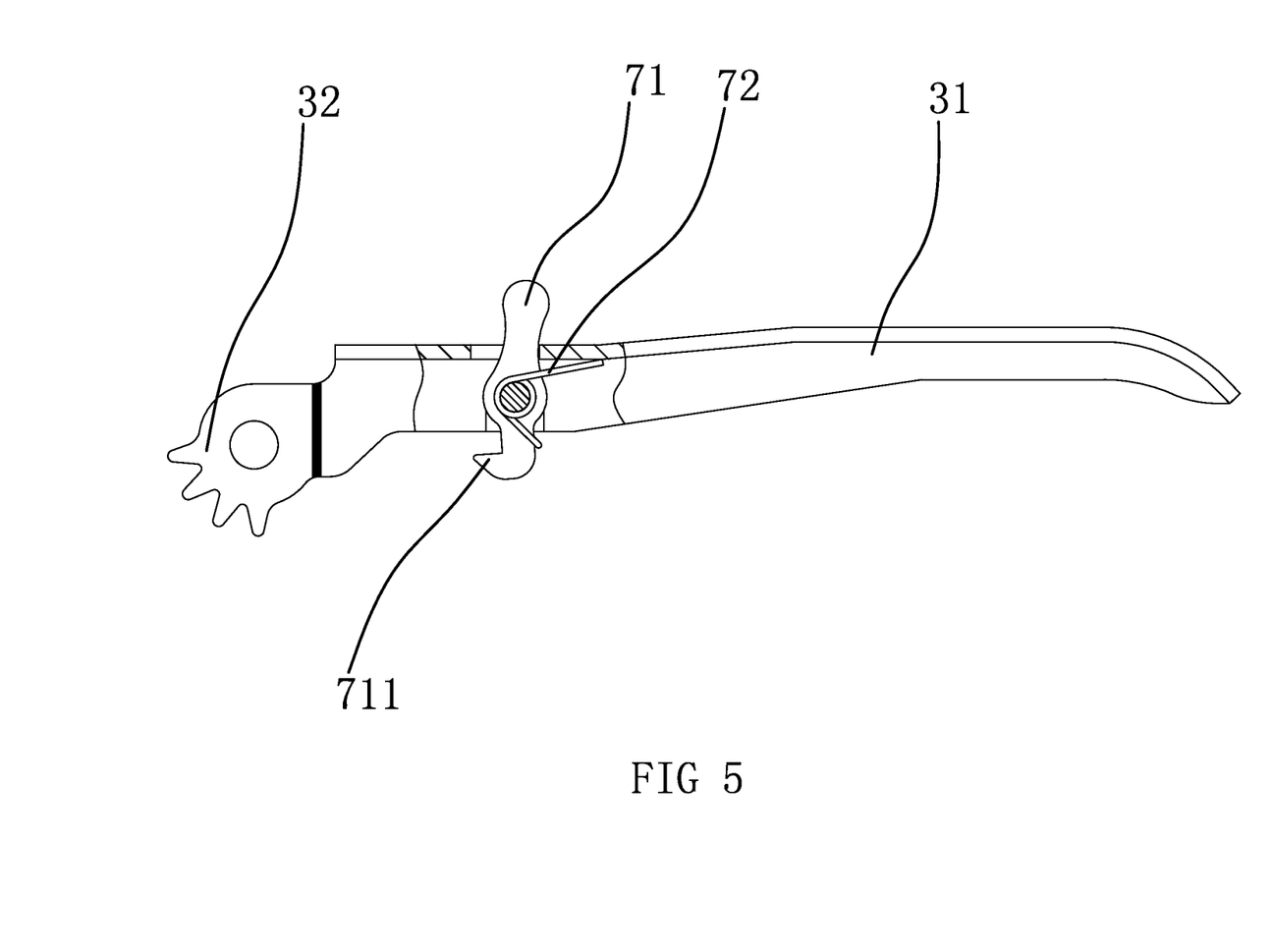
FIG. 5 is the schematic view of the handle of an embodiment of the cargo support device.

As shown in FIG. 1 and FIG. 4, the inner tube (1) stretches out of the outer end of the outer tube (2), so the inner diameters at the outer end of the outer tube (2) and the opening (6) are less than that at the inner end of the outer tube (2). The inner wall of the outer tube (2) plays a limited role in limiting the position, prevents the inner tube (1) from swaying, keeps it stable and mitigates the additional wear of the teeth (53).

Figure 6:
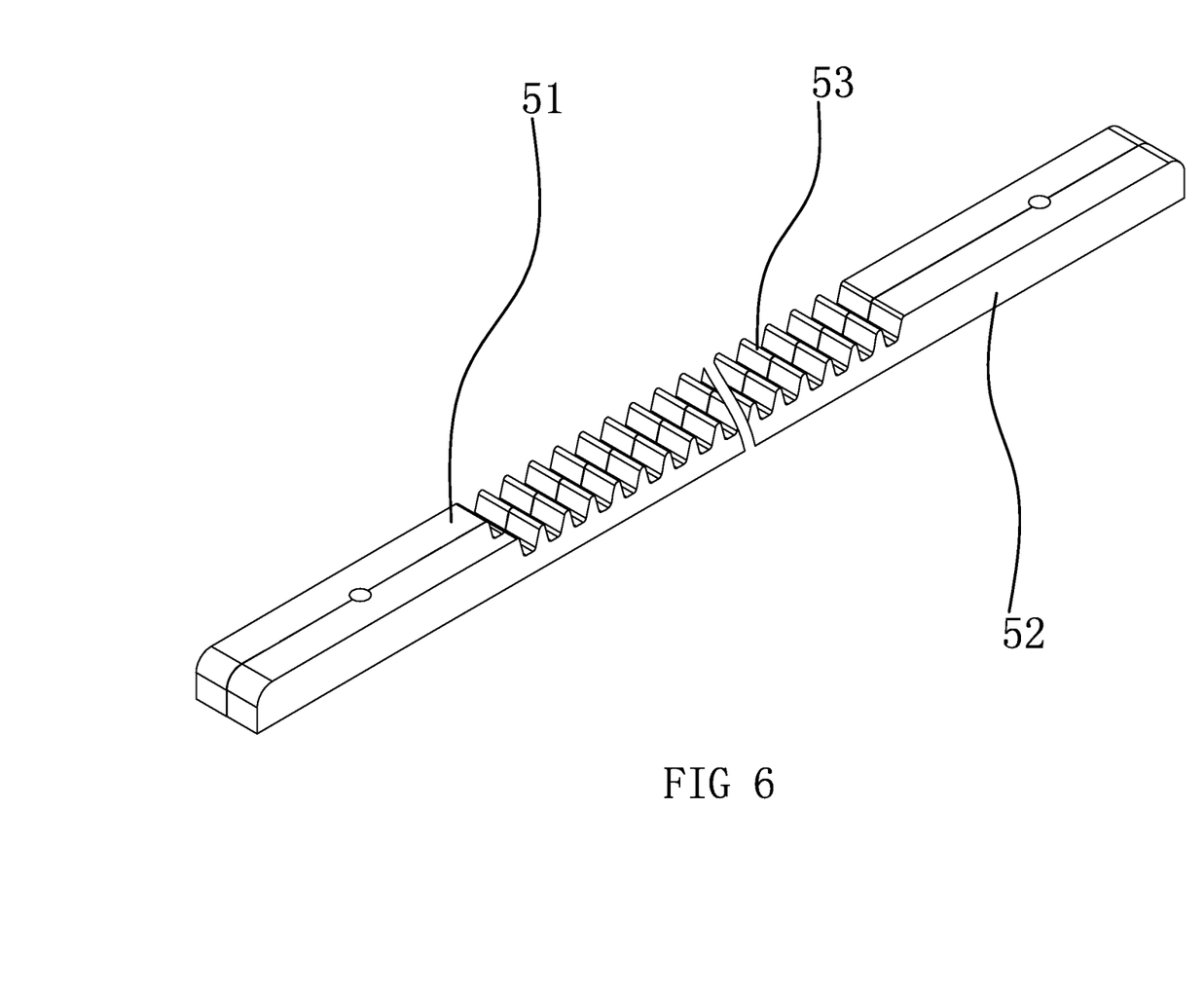
FIG. 6 is the perspective schematic view of an embodiment of the half rack I and half rack II.
Figure 7:
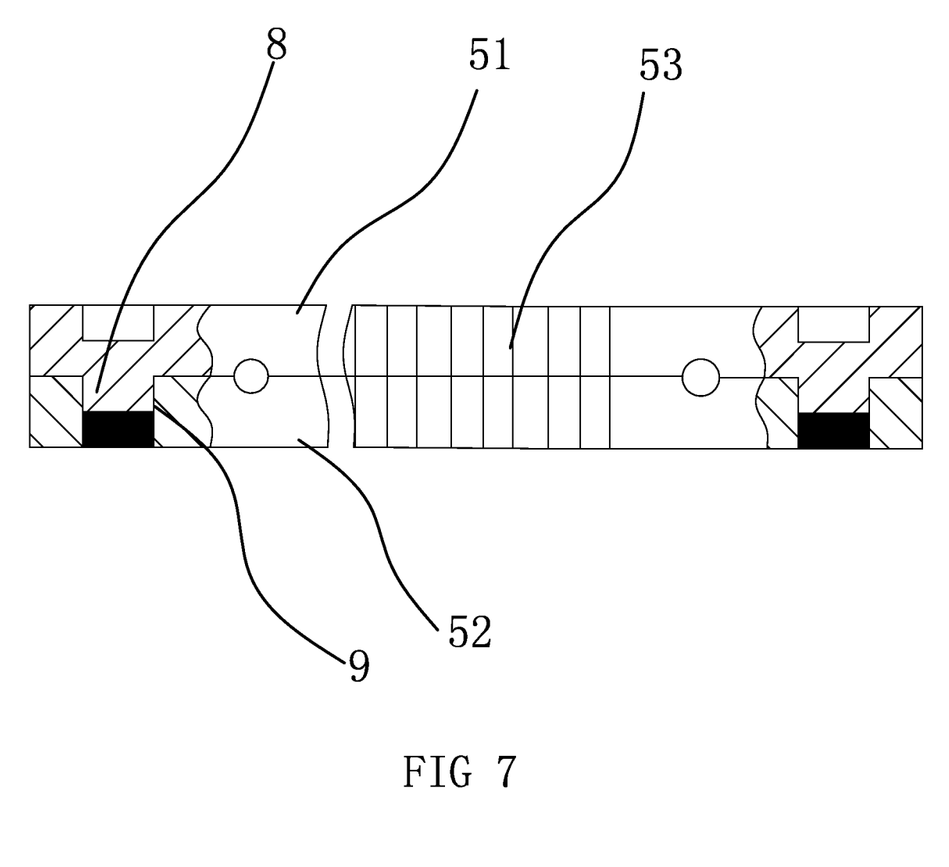
FIG. 7 is the detailed cutaway schematic view of an embodiment of the half rack I and half rack II.

As shown in FIG. 6 and FIG. 7, in one embodiment, the long toothed rack (5) is formed by the combination of a half rack I (51) and a half rack II (52). There is a protrusion (8) on one side of the half rack I (51) and there is a recess (9) on the one side of the half rack II (52) fitting the protrusion (8). The half rack I (51) and the half rack II (52) are aligned side by side. With the fit between the protrusion (8) and the recess (9), the half rack I (51) and half rack II (52) are connected, and the relative position is limited, and keeps the stability of the long toothed rack (5) formed by the half rack I (51) and the half rack II (52). After the half rack I (51) and half rack II (52) are joined together by inserting the protrusion (8) into the recess (9), the firmness of the assembly is enhanced by welding. Holes are punched on the whole long toothed rack. The half rack I (51) and half rack II (52) are embedded in the groove (4) on the inner tube (1) and fixed on the groove (4) by pins (12) inserted through the holes. The teeth of half rack I (51) and half rack II (52) are the same. Both of the half rack I (51) and half rack II (52) are punch formed. The teeth of both of half rack I (51) and half rack II (52) are aligned, forming a complete long toothed rack (5) just as effective and enabling low-cost punching process production.

In one embodiment, the depth of the teeth (53) of the half rack I (51) and half rack II (53) is 10 mm, and the teeth are fully able to mesh with the ratchet.

The description of the preferred embodiments serves only as an illustration of the spirit of the invention. It will be understood by those skilled in the art that various changes or supplements in form and details or substitution by similar methods may be made therein without departing from the spirit and scope of the invention as defined by the appended claims.

Although the terms of Inner Tube (1), Outer Tube (2), Handle (3), Grip (31), Ratchet (32), Groove (4), Long Toothed Rack (5), Half Rack I (51), Half Rack II (52), Teeth (53), Opening (6), Locator (7), Clip (71), Hook (711), Torsion Spring (72), Protrusion (8), Recess (9), Bracket (10), Cylinder (101), Gap (102), Fixing Plate (103), Bolt (104), Block (11) and Pin (12) are often used herein, it does not exclude the use any other terms. Using such terms is only to describe or explain the nature of the embodiments. Any additional restrictions are contrary to the spirit of the present invention.

LIST OF REFERENCE NUMERALS

1 Inner Tube
2 Outer Tube
3 Handle
31 Grip
32 Ratchet
4 Groove
5 Long Toothed Rack
51 Half Rack I
52 Half Rack II
53 Teeth
6 Opening
7 Locator
71 Clip
711 Hook 72 Torsion Spring
8 Protrusion
9 Recess
10 Bracket
101 Cylinder
102 Gap
103 Fixing Plate
104 Bolt
11 Block
12 Pin

What is claimed is:

1. A cargo support device comprising:
   an inner tube (1);
   an outer tube (2) enclosing the inner tube (1), the inner tube (1) capable of partially stretching out from the outer tube (2);
   a handle (3) hinged on the outer tube (2);
   a strip-shaped groove (4) on the inner tube (1) in an axial direction;
   a long toothed rack (5) is embedded into the groove (4);
   a ratchet (32) at an end of the handle (3), which meshes with teeth (53) on the long toothed rack (5); and
   a locator (7) capable of locking the handle (3) when the ratchet (32) meshes with the teeth (53).

2. The cargo support device as claimed in claim 1, further comprising:
   an opening (6) on the outer tube (2), the ratchet (32) capable of passing through the opening (6) and meshes with the teeth (53) on the long toothed rack (5).

3. The cargo support device as claimed in claim 2 wherein the opening (6) is a hole through a wall of the outer tube (2).

4. The cargo support device as claimed in claim 1, further comprising:
   a bracket (10) installed on the outer tube (2), the bracket (10) comprising a cylinder (101) enclosing the outer tube (2);
   a gap (102) on a side wall of the cylinder (101) in a second axial direction;
   two fixing plates (103) installed outwards on both of two sides of the gap (102) on the cylinder (101), and the handle (3) is hinged on the fixing plates (103);
   a bolt (104) on the bracket (10), the bolt (104) passing through the two fixing plates (103); and
   a grip (31) on one end of the handle (3) and the ratchet (32) is on another end of the handle.

5. The cargo support device as claimed in claim 4 wherein there is the bolt (104) on the bracket (10) passing through the two fixing plates (103), and the handle (3) is hinged on the fixing plates (103) with the bolt (104).

6. The cargo support device as claimed in claim 4 wherein both an opening (6) and the ratchet (32) are inside the bracket (10).

7. The cargo support device as claimed in claim 4 wherein a block (11) is fixed to the bracket (10), the block (11) is between the two fixing plates (103) located at a hinge point of the handle (3) near the grip (31), and when rotated around the hinge point, the handle (3) will lean against the block (11).

8. The cargo support device as claimed in claim 7 wherein the locator (7) is a clip (71), whose middle part is hinged on the handle (3), a first end of the clip (71) stretches upwards out of the handle (3), a second end of the clip has a hook (711) that stretches downwards out of the handle (3), and in a middle part of the clip (71), a torsion spring (72) is installed that allows the hook (711) to rotate around a hinge point and lean against the block (11).

9. The cargo support device as claimed in claim 1 wherein the inner tube (1) stretches out of an outer end of the outer tube (2), so inner diameters at the outer end of the outer tube (2) and an opening (6) are less than that at an inner end of the outer tube (2).

10. The cargo support device as claimed in claim 2 wherein the inner tube (1) stretches out of an outer end of the outer tube (2), so inner diameters at the outer end of the outer tube (2) and the opening (6) are less than that at an inner end of the outer tube (2).

11. The cargo support device as claimed in claim 3 wherein the inner tube (1) stretches out of an outer end of the outer tube (2), so inner diameters at the outer end of the outer tube (2) and the opening (6) are less than that at an inner end of the outer tube (2).

12. The cargo support device as claimed in claim 2, further comprising:
    a bracket (10) installed on the outer tube (2), the bracket (10) comprising a cylinder (101) enclosing the outer tube (2);
    a gap (102) on a side wall of the cylinder (101) in a second axial direction;
    two fixing plates (103) installed outwards on both of two sides of the gap (102) on the cylinder (101), and the handle (3) is hinged on the fixing plates (103);
    a bolt (104) on the bracket (10), the bolt (104) passing through the two fixing plates (103); and
    a grip (31) on one end of the handle (3) and the ratchet (32) is on another end of the handle.

13. The cargo support device as claimed in claim 12 wherein there is the bolt (104) on the bracket (10) passing through the two fixing plates (103), and the handle (3) is hinged on the fixing plates (103) with the bolt (104).

14. The cargo support device as claimed in claim 12 wherein both the opening (6) and the ratchet (32) are inside the bracket (10).

15. The cargo support device as claimed in claim 12 wherein a block (11) is fixed to the bracket (10), the block (11) is between the two fixing plates (103) located at a hinge point of the handle (3) near the grip (31), and when rotated around the hinge point, the handle (3) will lean against the block (11).

16. The cargo support device as claimed in claim 15 wherein the locator (7) is a clip (71), whose middle part is hinged on the handle (3), a first end of the clip (71) stretches upwards out of the handle (3), a second end of the clip has a hook (711) that stretches downwards out of the handle (3), and in a middle part of the clip (71), a torsion spring (72) is installed that allows the hook (711) to rotate around a hinge point and lean against the block (11).

17. The cargo support device as claimed in claim 3, further comprising:
    a bracket (10) installed on the outer tube (2), the bracket (10) comprising a cylinder (101) enclosing the outer tube (2);
    a gap (102) on a side wall of the cylinder (101) in a second axial direction;
    two fixing plates (103) installed outwards on both of two sides of the gap (102) on the cylinder (101), and the handle (3) is hinged on the fixing plates (103);
    a bolt (104) on the bracket (10), the bolt (104) passing through the two fixing plates (103); and
    a grip (31) on one end of the handle (3) and the ratchet (32) is on another end of the handle.

18. The cargo support device as claimed in claim 17 wherein there is the bolt (104) on the bracket (10) passing through the two fixing plates (103), and the handle (3) is hinged on the fixing plates (103) with the bolt (104).

19. The cargo support device as claimed in claim 17 wherein both the opening (6) and the ratchet (32) are inside the bracket (10).

20. The cargo support device as claimed in claim 17 wherein a block (11) is fixed to the bracket (10), the block (11) is between the two fixing plates (103) located at a hinge point of the handle (3) near the grip (31), and when rotated around the hinge point, the handle (3) will lean against the block (11).

\* \* \* \* \*